US005395673A

United States Patent [19]

Hunt

[11] Patent Number: 5,395,673

[45] Date of Patent: Mar. 7, 1995

[54] NON-SLIP COMPOSITION AND METHOD OF APPLYING SAME TO A SURFACE

[76] Inventor: Gary B. Hunt, 5227 SW. 90th Ct., Miami, Fla. 33165

[21] Appl. No.: 974,110

[22] Filed: Nov. 10, 1992

Related U.S. Application Data

[63] Continuation-in-part of Ser. No. 872,335, Apr. 23, 1992.

[51] Int. Cl.[6] .......... D06N 7/04; B32B 3/00; E01C 11/24

[52] U.S. Cl. .......... 428/148; 428/143; 428/156; 428/172; 428/209; 428/328; 428/402; 428/690; 428/702; 404/14; 404/16; 404/19; 404/21

[58] Field of Search .......... 428/150, 172, 141, 143, 428/148, 206, 209, 207, 328, 409, 402, 908.8, 690, 702; 404/14, 16, 19, 21

[56] References Cited

U.S. PATENT DOCUMENTS

| | | | |
|---|---|---|---|
| 4,937,127 | 6/1990 | Haenggi et al. | 428/148 |
| 4,988,555 | 1/1991 | Hedblom | 428/172 |
| 5,053,253 | 10/1991 | Haenggi et al. | 427/204 |
| 5,094,902 | 3/1992 | Haenggi et al. | 428/150 |
| 5,124,178 | 6/1992 | Haenggi et al. | 427/204 |
| 5,227,221 | 7/1993 | Haenggi et al. | 428/172 |

*Primary Examiner*—Donald J. Loney
*Attorney, Agent, or Firm*—Keck, Mahin & Cate

[57] ABSTRACT

A non-slip composition for application to a ground surface where lighting conditions may be poor including a polymer epoxy having two parts of diglycidyl ether resin and one part aliphatic amine adduct modified with 30% AEP as a stabilizer. A phosphorescent pigment including zinc, sulfide, and copper may be mixed with the epoxy to provide luminescent characteristics thereto. During application, a clear aluminum oxide aggregate is spread across a layer of the applied epoxy prior to curing, thereby enhancing the light emitting properties of the phosphorescent pigment as well as providing non-slip characteristics to the exposed surface of the applied layer of epoxy.

3 Claims, 3 Drawing Sheets

NON-SLIP COMPOSITION AND METHOD OF APPLYING SAME TO A SURFACE

BACKGROUND OF THE INVENTION

This is a continuation in part to the prior patent application filed Apr. 23, 1992, and assigned Ser. No. 07/872,335.

1. Field of the Invention

The present invention relates to a composition to be applied to a ground surface and having a non-slip texture, the composition including an epoxy which may be impregnated with a phosphorescent pigment or a coloring pigment to enhance the visibility thereof.

2. Description of the Related Art

Highly visible surface marks containing means to enhance their visibility are generally well-known in the related art. Many of these markers have been used for application to road surfaces, walkways, steps, and the like to increase their visibility by imparting light reflective qualities thereto.

Other surface materials have been known in the related art to provide non-slip or anti-skid qualities thereto and have been generally used for application in areas where accidental falls from slipping are quite frequently encountered. Generally, these anti-skid surfaces include a granular substance such as sand or ground stone mixed with a surface composition which, when cured, provides an abrasive, non-slip texture.

Specifically, U.S. Pat. No. 3,030,870 discloses a road lane marker that incorporates fluorescent particles and glass spheres in a layered resin to aid in nighttime driving, wherein the light from an automobile's headlights will reflect off the fluorescent particles and glass spheres, thereby enhancing the visibility of the road lane markers.

U.S. Pat. No. 2,952,192 discloses a marker stripe which is resin-based and utilizes a sandwiched-type application, wherein glass beads or sand coated with fluorescent materials is disposed in an intermediate layer between two layers of resin. Again, light from a vehicle or other source is generally required to enhance the visibility of the marker stripe by reflecting off the glass beads or fluorescent materials.

In view of the surface compositions presently known in the art, there still exists a need in the related industry for a non-slip, highly visible composition which may be impregnated with a phosphorescent pigment providing high visibility in poorly lighted areas, and which is resistant to wear and abrasion over an extension period of time. Specifically, there is a need for a surface composition which can be applied to steps, such as concrete steps in an arena or stadium where lighting conditions are at times not sufficient to provide enough visibility for patrons traveling the steps, or in a work area to mark danger zones around machinery, or like hazardous areas. In the recent past, a large number of accidents have occurred in sports arenas and stadiums due to individuals slipping or falling when walking up or down the steps to and from their seats. This may be due to slipping on catchup, grease, and other food substances which frequently accumulate on the floor surfaces during the course of an event at the arena or stadium. Accidents due to falls on steps are also common, especially during low lighting level type events, due to the difficulty in seeing the edge of the steps, and thus determining where one step ends and another begins.

In view of the foregoing, it is an object of the present invention to provide a composition adapted to be applied to various surfaces including cement surfaces and metal surfaces and which includes a non-slip texture, thereby providing a non-slip surface which is highly visible in all light conditions.

It is a further object of the present invention to provide a highly visible non-slip surface composition which is adapted to withstand high impact and which is further resistant to wear and abrasion.

It is yet a further object of the present invention to provide a non-slip composition which can be easily and cost-effectively applied to various ground surfaces such as cement steps in a sports arena or stadium.

It is still a further object of the present invention to provide a non-slip composition which has strong adhesion qualities adapted to adhere to virtually any surface including porous cement surfaces and metal surfaces, such as those found on seagoing vessels.

It is still a further object of the present invention to provide a non-slip composition which can be easily applied in public facilities such as a sports arena or stadium and which is generally aesthetically neutral, thereby not interfering with the overall decor of the facility.

A further object of the present invention is to provide a non-slip composition which can be applied in a variety of configurations so as to be applicable in any circumstance where an area or edge surface necessitates high visibility.

These and other objects and advantages of the present invention will be more readily apparent in the description which follows and the scope of the invention will be indicated in the claims.

SUMMARY OF THE INVENTION

The present invention is directed to a non-slip composition and method of applying the same to a ground surface such as steps, walkways, and the like where lighting conditions may, at times, be insufficient, or highly visible boundary markings are necessary. The composition includes a two part medium curing polymeric epoxy compound which is mixed with a phosphorescent pigment to provide qualities thereto, thereby providing an effective means for illumination of steps and other surfaces, particularly in high traffic areas such as indoor arenas and stadiums, or factories and wharehouses. The composition can also be applied to various surfaces in order to identify the location of emergency equipment, switches, or exits during a power failure, wherein the applied composition may include indicia thereon which is visible even in areas of little or no light.

The non-slip composition of the present invention includes the two part, polymeric epoxy compound consisting of two parts of diglycidyl ether resin and one part of aliphatic amine adduct which is modified with 30% amyl ethyl piperidine (hereinafter AEP) as a stabilizer. Two pounds per gallon of zinc sulfide-copper activated are added during manufacture and one pound per gallon of aluminum oxide aggregate is added during the application by spreading evenly across an exposed surface of the applied composition prior to curing. During production, the zinc sulfide-copper active is folded into the modified aliphatic amine adduct and mixed at a slow speed. This mixture is further added with the diglycidyl ether resin for shipment.

Prior to application, the surface to which the composition is going to be applied must be cleaned so as to be free of all foreign materials such as dirt, food, and the like. The cleaned surface can then be mechanically abraded to a surface profile of four to six mils. Once the area is again cleaned after abrasion, an application area is outlined by applying tape in a desired pattern. The composition is then applied using a paintbrush or like instrument to effectively apply a layer of the composition having a thickness of generally between 1/16" to ⅛" thick. Immediately following application of the composition to the surface, the aluminum oxide aggregate can be manually broadcasted across the exposed surface of the applied layer of composition so as to effectively settle within the composition prior to curing. When applying to steel or other metal surfaces, cleaning of the surface requires removal of all petroleum and silicon products and other residues therefrom prior to mechanically abrading the surface and further preparation for applying the composition thereto.

BRIEF DESCRIPTION OF THE DRAWINGS

For a fuller understanding of the nature of the present invention, reference should be had to the following detailed description taken in connection with the accompanying drawings in which:

FIG. 2 is a cross-sectional view taken along line 2—2 of FIG. 1.

FIG. 3 is a top perspective view illustrating the application method of a preferred embodiment of the present invention.

FIG. 4 is an exploded view shown in perspective of a second preferred embodiment of the present invention.

Like reference numerals refer to like parts throughout the several views of the drawings.

DETAILED DESCRIPTION OF THE PREFERRED EMBODIMENTS

Figure 1:
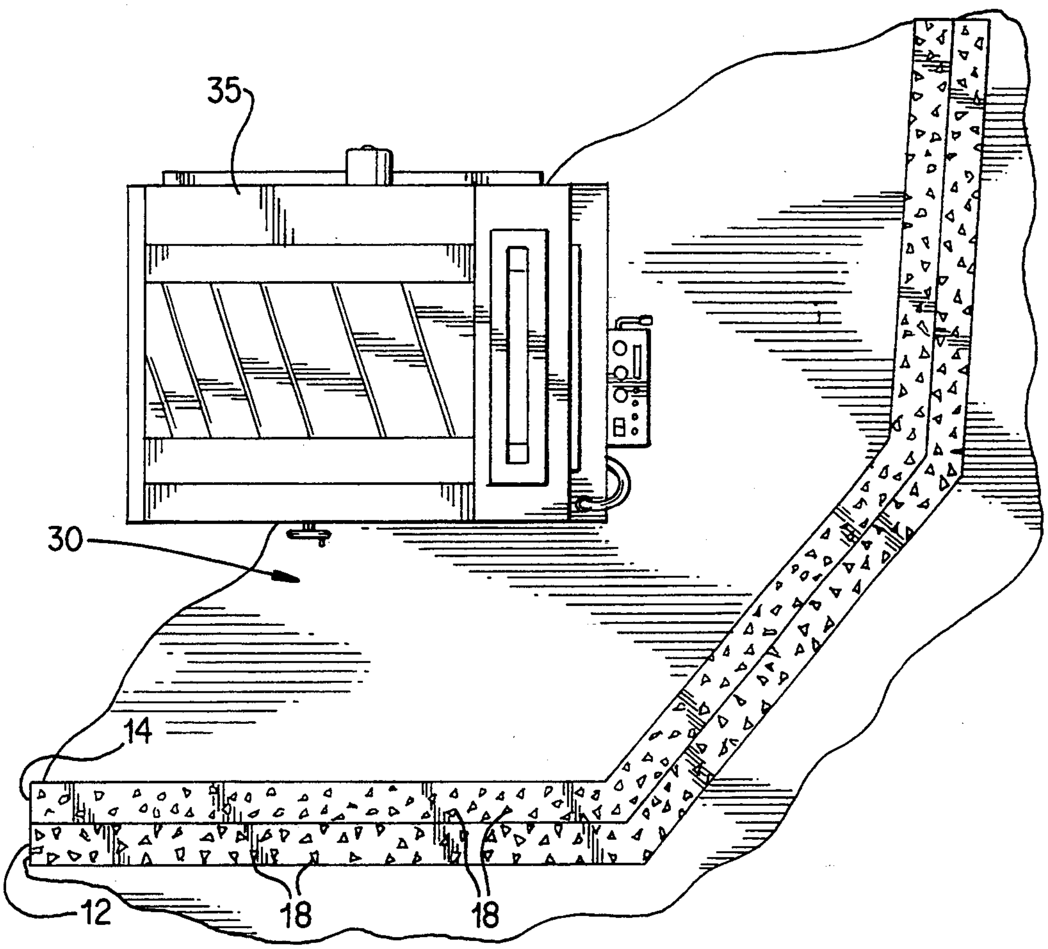
FIGS. 1–5 show a perspective view of a preferred embodiment of the present invention shown as applied to the upper surface of a step.
Figure 2:
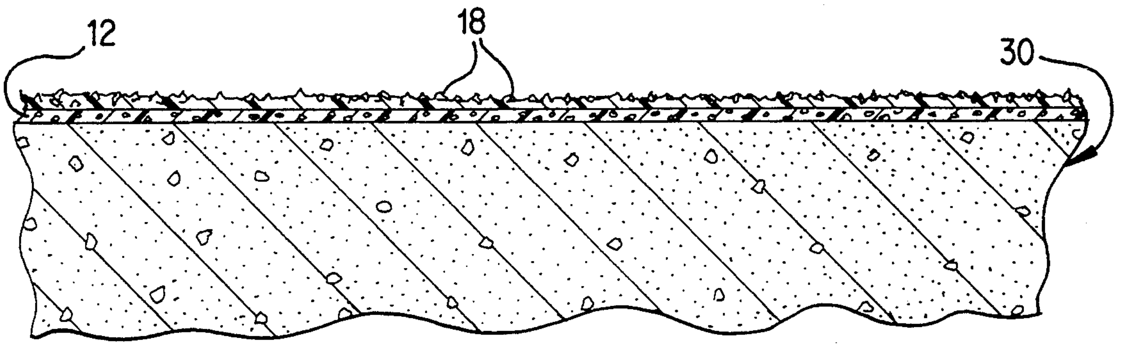
Figure 3:
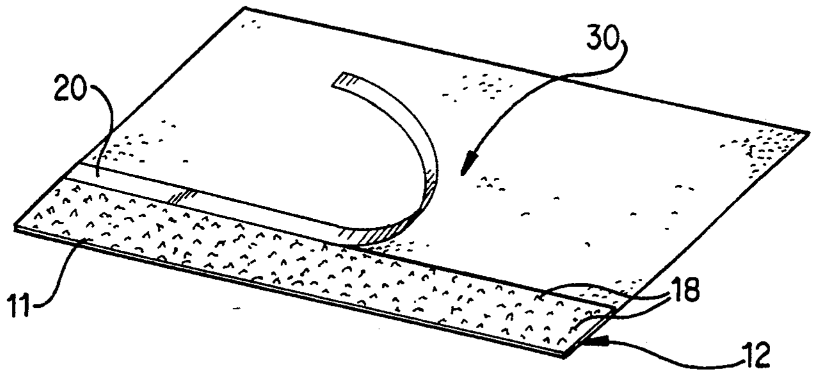

A first preferred embodiment of the present invention is illustrated in FIGS. 1–3, wherein application of the composition of the present invention is shown on a floor surface 30 which may be formed of concrete or any other appropriate material. The floor surface 30 may include an area surrounding heavy machinery, stair surfaces, areas of heavy equipment traffic, loading platforms, or any like area where clear defined markings and a non-slip surface would be beneficial. As best seen in FIG. 1, the floor surface 30 is coated with three separate strips 12, 14, 16 of various resin-based compounds which further contain an aggregate material 18, preferably aluminum oxide, to impart non-skid characteristics to the floor surface 30. To carry out the application of the present invention in the first embodiment, the floor surface 30 is preferably cleaned with conventionally-known commercial cleansers so as to remove any foreign substances such as dried food, oils, loose granular particles and the like. The floor surface 30 is then mechanically abraded to impart a roughened porous surface, preferably having a surface profile of 4 to 6 mils. The floor surface 30 is then cleaned again to remove dust and debris that generated from the abrasion process. Once the surface 30 has been properly cleaned and roughened, it is ready for application of the various resin-based compounds thereto.

Prior to application of the compounds to the surface 30, at least two lengths of tape 20 are adhered along the floor surface 30 defining a desired configuration to be coated. A first epoxy resin-based composition 12 is then painted on the floor surface 30 forming a layer of approximately 1/16" to ⅛" thick along the strip between the tape lengths 20. The first epoxy resin-based composition 12 is preferably impregnated with a coloring pigment to enhance visibility during lighted conditions. The first epoxy resin-based composition 12 is preferably made of the following formula:

Two parts diglycidyl ether resin;

One part aliphatic amine adduct modified with 30% AEP as a stabilizer;

20% coloring pigment

Immediately following the application of the layer of the first epoxy resin-based composition 12, an aluminum oxide aggregate 18 is broadcast across the uncured exposed surface of the composition 12 such that the individual grains of the aggregate 18 become at least partially embedded within the layer of composition 12 with a portion protruding therefrom, thereby forming a rough, non-slip textured surface. Once the first composition 12 is at least partially cured, the lengths of the tape 20 may be removed and an additional length of tape 20' may be applied along the floor surface 30 in parallel spaced relation from the strip of first composition 12.

Throughout the area defined between the strip of first composition 12 and the tape 20', a second epoxy resin composition 14 is applied using a brush in the same manner as application of the first composition 12, to form a layer of approximately 1/16" to ⅛" in thickness. The second epoxy resin-based composition 14 is preferably of the following formula:

Two parts diglycidyl ether resin;

One part aliphatic amine adduct modified with 30% AEP as a stabilizer;

Two pounds per gallon of zinc sulfide-copper activated.

Figure 5:
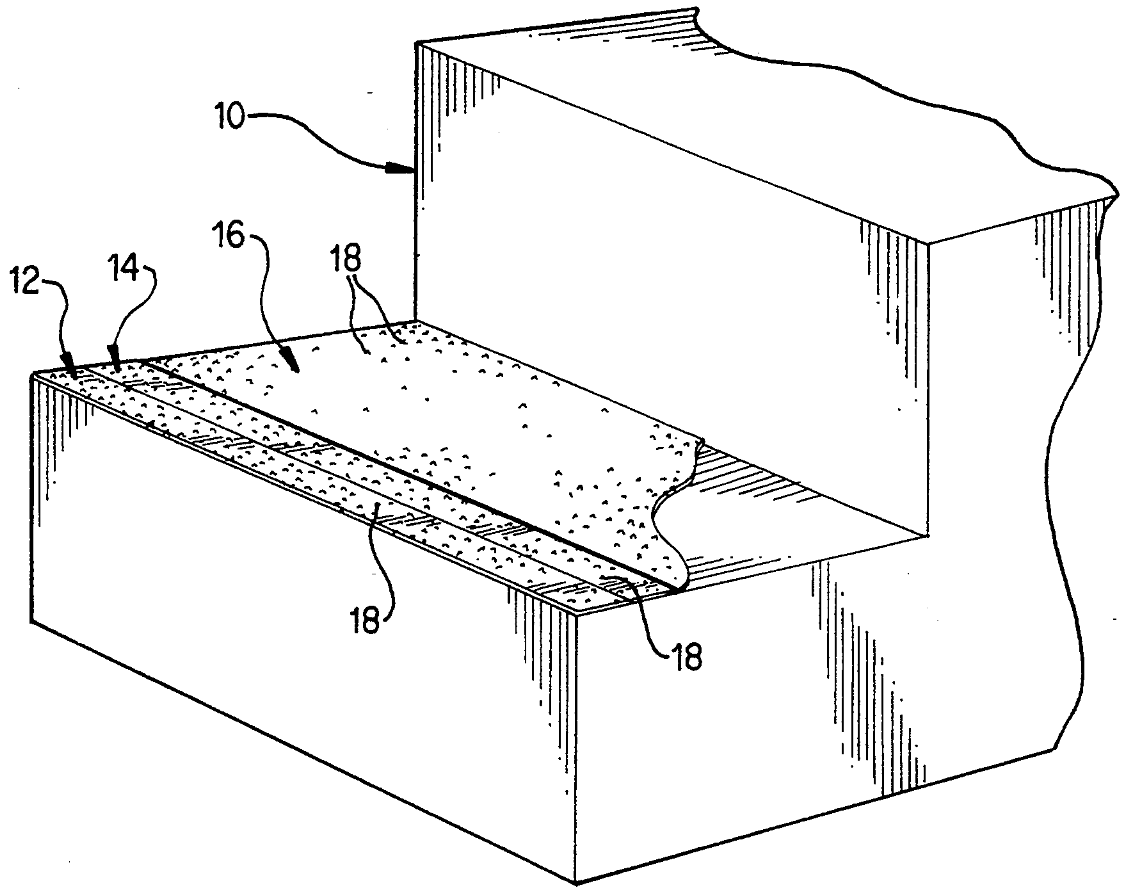

Immediately after application of the second composition, the aluminum oxide aggregate 18 is once again broadcast over the exposed surface thereof prior to curing, such that the aggregate becomes at least partially embedded within the layer of the second composition 14 in a manner wherein the exposed surface, when cured, has a rough, non-slip texture. The second epoxy resin-based composition 14 contains a phosphorescent pigment, which in the preferred embodiment, is zinc sulfide-copper activated. The phosphorescent pigment provides characteristics to the second composition 14, thereby providing visibility during periods of little or no light. If treating a stair surface 10, as shown in FIG. 5, the strip of the second composition 14 is strategically placed at approximately to 1" to 1¼" from an edge of the step where the ball of one's foot normally lands when traveling the steps, thereby providing a visual indication easily seen within one's peripheral vision and thus preventing accidental falls. The strip 14 will provide an individual with the ability to judge the stair's locations in conditions of little or no light, as the strip of the second composition 14 will be placed at the same distance from the edge 11 of each of the steps 10. The aluminum oxide aggregate 18 in the second strip of composition also serves to provide a reflective quality thereto, thereby increasing the light emitting capabilities of the phosphorescent pigment.

Once the strip of the second composition 14 has at least partially cured, the tape 20' can be removed to expose a remaining area floor surface 30 which can be coated with a layer of a third epoxy resin-based composition. In the preferred embodiment, the third epoxy resin-based composition 16 is preferably formed of the following formula:

Two parts diglycidyl ether resin;

One part aliphatic amine adduct modified with 30% AEP as a stabilizer.

The third composition 16 is spread on the remaining portion of the floor surface 30 to be coated in the same manner as the earlier compositions, and then the aluminum oxide aggregate 18 can be spread thereacross prior to curing in the same manner as the previous applications. This third strip of composition 16 is preferably clear in color and is incorporated so as to maximize the non-skid properties of the floor surface 30, thereby preventing slips and other accidental falls which frequently occur on such surfaces.

Figure 4:
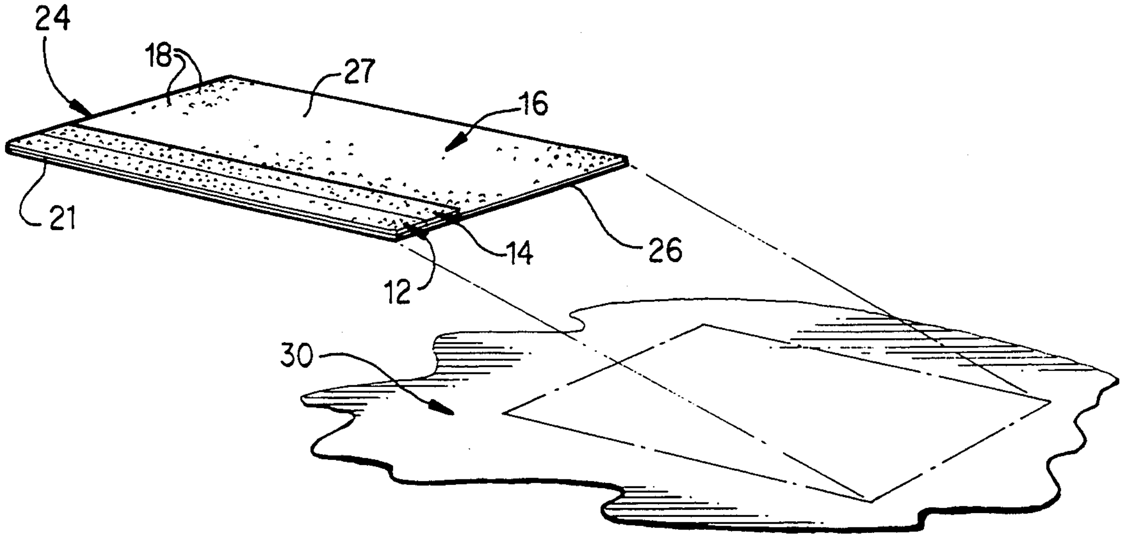

The second preferred embodiment is illustrated in FIG. 4 and generally includes a cover strip 24 which is manufactured prior to installation, and then shipped to the installation site where it can be easily installed by use of commercially available adhesives and/or hardware anchoring means such as concrete nails, screws, and the like. The cover strip 24 includes a base 26 which may be formed by extrusion, roll forming or other suitable means. Alternatively, the base 26 may be made of a rubber or other suitable vinyl material which is durable, wear-resistant, and adapted to be adhered to various surfaces. The base 26 is configured for application over a particular exposed surface, such as a step or a planar floor surface 30. The base 26 is prepared by cleaning and roughening an application surface thereof to provide sufficient porous and adhesive characteristics for application of an epoxy resin-based composition thereto. The exposed, prepared surface of the base, can be coated with the same three epoxy resin-based compositions 12, 14, 16 in exactly the same manner as set forth in the first embodiment. The first pigmented composition 12 is applied adjacent the outer edge 21, the composition 14 is been applied adjacent and directly behind the first pigmented composition 12 and the clear epoxy 16 is thereafter applied to a remainder of the exposed surface of the base 26. The aluminum oxide aggregate material 18 is sprinkled over all three defined areas 12, 14, 16 prior to curing, and immediately after each application to impart non-skid characteristics thereto.

Accordingly, through the use of the prefabricated cover strips 24, the steps 10 of an arena or stadium, or the floor or platform surfaces of a factory or wharehouse could be quickly and easily treated to provide a highly visible, non-slip covering which would be visible during all lighting conditions. An appropriate number of cover strips 24 in accordance with the requirements of the facility would be delivered to the installation site. After cleaning and preparing the floor surface 30, the strips 24 could be quickly and easily installed by adhesives or various anchoring hardware.

The particular order and orientation of applying the layers of epoxy may be varied according to the needs of a particular location. Accordingly, only a single layer, or a large number of layers may be applied in any order or combination of coloring pigment, luminescent pigment and clear.

The present invention has been described in what is believed to be a preferred embodiment at the time of the invention; however, it should be realized that various modifications and changes may be made without departing from the spirit of the present invention and therefore the scope of the invention should not be limited except as set forth in the claims which follow and within the doctrine of equivalents.

What is claimed is:

1. A non-slip surface to be applied to an exposed surface comprising:
   - a base structured and configured to be attached to said exposed surface in overlaying, covering relation thereto, and including an exposed planar surface portion,
   - said base being coated on said exposed planar surface portion with a highly visible, anti-skid coating material which comprises polymeric epoxy compound mixed with a phosphorescent pigment which includes copper activated zinc sulfide, and further including an aggregate material spread therethrough prior to curing.

2. A non-slip surface as set forth in claim 1 wherein said polymeric epoxy compound includes two parts per gallon of diglycidyl ether resin and one part per gallon of aliphatic amine adduct modified with 30% amyl ethyl piperidine.

3. A non-slip surface as set forth in claim 1 wherein said aggregate includes aluminum oxide.

* * * * *